United States Patent [19]

Buxbaum et al.

[11] 4,400,432
[45] Aug. 23, 1983

[54] COATING IRON OXIDE PARTICLES FOR MAGNETIC RECORDING

[75] Inventors: Gunter Buxbaum, Krefeld; Ingo Pflugmacher, Meerbusch; Franz Hund, Krefeld; Volker Hahnkamm, Krefeld; Peter Woditsch, Krefeld, all of Fed. Rep. of Germany

[73] Assignee: Bayer Aktiengesellschaft, Leverkusen, Fed. Rep. of Germany

[21] Appl. No.: 305,577

[22] Filed: Sep. 24, 1981

Related U.S. Application Data

[62] Division of Ser. No. 21,870, Mar. 19, 1979, Pat. No. 4,323,596.

[30] Foreign Application Priority Data

Apr. 12, 1978 [DE] Fed. Rep. of Germany ....... 2815712

[51] Int. Cl.³ .................... B32B 5/16; B22F 1/02; G11B 5/62; C01G 49/02
[52] U.S. Cl. ........................ 428/403; 252/62.58; 252/62.57; 252/62.56; 252/62.59; 427/127; 427/128; 428/323; 428/329; 428/333; 428/694; 428/900
[58] Field of Search ............... 428/900, 694, 695, 403, 428/329, 323, 333; 360/134, 135, 136; 75/5 AA, 5 BA; 252/62.58, 62.59, 62.54, 62.55, 62.56, 62.57; 148/105; 427/127, 128; 423/633, 634

[56] References Cited

U.S. PATENT DOCUMENTS

| | | | |
|---|---|---|---|
| 3,652,334 | 3/1972 | Abech et al. ........................ | 427/127 |
| 3,837,912 | 9/1974 | Roden ................................. | 148/105 |
| 3,928,709 | 12/1975 | Audran et al. .................... | 252/62.56 |
| 3,966,510 | 6/1976 | Aonuma ........................... | 252/62.56 |
| 3,974,079 | 8/1976 | Woditsch ......................... | 252/62.56 |
| 4,014,710 | 3/1977 | Woditsch ........................... | 106/304 |
| 4,063,000 | 12/1977 | Aonuma .......................... | 75/0.5 AA |
| 4,066,565 | 1/1978 | Sasazama et al. .................... | 427/127 |
| 4,067,755 | 1/1978 | Umeki ............................ | 75/0.5 AA |
| 4,115,106 | 9/1978 | Snavel ............................ | 75/0.5 AA |
| 4,125,474 | 11/1978 | Dezawa ............................... | 427/127 |
| 4,155,748 | 5/1979 | Steck ................................. | 252/62.55 |
| 4,165,232 | 8/1979 | Jaechh et al. ....................... | 427/127 |
| 4,178,171 | 12/1979 | Steck et al. ....................... | 148/105 |
| 4,197,437 | 4/1980 | Ogawa ............................. | 75/0.5 BA |
| 4,256,484 | 3/1981 | Rodrian .......................... | 75/0.5 BA |
| 4,274,865 | 6/1981 | Suzuki ............................ | 75/0.5 AA |

FOREIGN PATENT DOCUMENTS

| | | |
|---|---|---|
| 2810395 | 1/1979 | Fed. Rep. of Germany . |
| 2743298 | 4/1979 | Fed. Rep. of Germany ... 75/0.5 AA |
| 1395704 | 5/1975 | United Kingdom ............... 428/900 |

OTHER PUBLICATIONS

Bruce et al., *IBM Tech. Bull.*, vol. 20(5), Oct. 1977, pp. 1971-1972.

*Primary Examiner*—Ellis P. Robinson
*Attorney, Agent, or Firm*—Sprung, Horn, Kramer & Woods

[57] ABSTRACT

In the preparation of highly orientatable needle-shaped ferrimagnetic iron oxide particles by the reduction and reoxidation of needle-shaped particles of hydrated oxide of iron which have been surface treated against sintering the improvement which comprises effecting the surface treatment by applying to the particles of hydrated oxide of iron one layer of oxygen-containing anions and a further layer of polyvalent cations, each layer weighing about 0.02 to 2% by weight of the particle. Advantageously, the polyvalent cation-containing layer is applied between two oxygen-containing anion layers, the oxygen-containing anions used are selected from the group consisting of silicate, phosphate, borate, vanadate, molybdate and tungstate, the polyvalent cations used are selected from the group consisting of aluminum, chromium, manganese, iron and gallium, each layer weighs about 0.1 to 1% of the weight of the particles and before the reduction and reoxidation the surface treated particles of hydrated oxide of iron are tempered at a temperature of about 600° to 900° C.

3 Claims, No Drawings

COATING IRON OXIDE PARTICLES FOR MAGNETIC RECORDING

This is a division of application Ser. No. 21,870, filed Mar. 19, 1979, now U.S. Pat. No. 4,323,596.

The present invention relates to magnetic iron oxides having improved orientation when incorporated in a tape for the magnetic recording of signals and to a process for their preparation.

Since the work of Camras, anisometric oxides, in most cases $\gamma$-Fe$_2$O$_3$, are used for the recording of signals on magnetic supports. These iron oxides are prepared from an anisometrically crystallizing precursor compound. The precursor compound used is mostly FeOOH, geothite (a hydrated oxide of iron), which after dehydration is converted into Fe$_3$O$_4$ by reduction with hydrogen and subsequently into $\gamma$-Fe$_2$O$_3$ by oxidation.

As a result of the rapid development of magnetic recording techniques and because of the demand for an even higher density of recording with thinner magnetic layers of the type used in cassette techniques, the conventional $\gamma$-Fe$_2$O$_3$ materials are no longer capable of satisfying the more stringent requirements of the present day.

One important factor which determines the quality of a magnetic tape recording is its full output or maximum recording level. This factor together with the noise defines the dynamic range of a magnetic tape.

It is well known that the maximum recording level is directly influenced by the orientated recording density of the magnetic material in the recording layer. This orientated density is measured as the residual magnetization in the direction of the tape, divided by the saturation magnetization ($B_r/4\pi I_s$). This factor is also referred to as "orientatability". The high the $B_r/4\pi I_s$, the greater, given the same noise level, is the dynamic range of a magnetic tape. There are several factors which contribute against obtaining the highest possible $B_r/4\pi I_s$. Among these is the fact that the starting material, $\alpha$-FeOOH, frequently has concretions and dendrites. This difficultly can be minimized, however, by the method described in U.S. Pat. No. 3,931,025. Another deleterious factor is that sintering and further coalescence occurs during conversion due to the high temperatures employed. This sintering prevents the orderly orientation of the individual magnetic particles during manufacture of a magnetic tape. In addition, such sintered individual particles are inferior in their magnetic properties and produce a high noise level. In order that usable magnetic tapes can be obtained from such sintered pigments at all, the aggregates must be broken down by prolonged and intensive milling which, however, adversely affects other properties of the magnetic tape, such as the coercive field strength and print through.

Special precautions and measures must be taken to prevent such deleterious sintering. Some of these measures, such as enveloping the particles with SiO$_2$ or with titanium, zirconium or aluminum oxide (German Auslegeschrift No. 1,252,646) or enveloping them with phosphate or borate (U.S. Pat. No. 3,652,334) or with Cr(III) oxide (German Offenlegungsschrift No. 1,803,783) are already known. Although such measures improve the capacity of the particles for orientation, they do not do so to a sufficient extent. Enveloping with organic silicon compounds has also been proposed (U.S. Pat. No. 4,014,710) but these compounds are incompatible with various lacquer formulations and are therefore frequently unusable.

Various processes for improving the orientation have been proposed in which organic compounds such as carboxylic acids (German Auslegeschrift No. 1,771,327), amines, amides, alcohols (German Offenlegungsschrift No. 2,064,804), paraffins and similar compounds are applied to the precursor compounds before their conversion, and these organic compounds or their decomposition products are used to reduce the precursor compounds. The pyrolysis reaction, however, gives rise to considerable quantities of dangerous and malodorous waste gases which must subsequently be removed by extensive operations such as after burning or other methods. Inorganic after-treatments do not have this disadvantage.

It has now surprisingly been found that a substantial improvement in the orientatability is achieved if the hydrated oxide of an ironoxide precursor compound is subjected to several inorganic after-treatments.

The present invention therefore provides a process for the production of highly orientatable needle-shaped ferrimagnetic iron oxide by the reduction and reoxidation of needle-shaped hydrated oxide of iron which has been surface treated against sintering and has optionally been doped with foreign metal ions, characterized in that oxygen-containing anions alternating with multivalent cations are applied to the hydrated oxide of iron in at least two successive layers and in quantities of about 0.02 to 2% by weight, preferably about 0.1 to 1% by weight, in each layer, starting with an anion layer.

The first layer applied preferably consists of a polybasic anion which has a preference for iron oxide or hydrated oxide of iron surfaces, such as phosphate, borate, vanadate, molybdate, silicate or tungstate anion. The polyvalent cations used are preferably ions of the metals aluminum, chromium, manganese, iron and/or gallium.

Application of the surface layers to the hydrated oxides of iron may be achieved by, for example, dissolving the water-soluble salts in an aqueous suspension of the needle-shaped hydrated oxides of iron. The alkali metal salts of the anions are advantageously used for applying the anion layers. For applying the multivalent metal ions there may be used, for example, their chlorides, sulphates and/or hydroxides. The above mentioned after-treatment substances are preferably used in such quantities that monomolecular or monoatomic layers are formed on the hydrated oxides of iron.

Although excellent results are generally obtained with a two-stage after-treatment, a three-stage after-treatment, applying the layers in the sequence of anion-cation-anion, is regarded as optimal. A further improvement in the orientation can frequently be observed if the number of layers is further increased, but this, of course, also increases the expense and effort required for the after-treatment.

The hydrated oxides of iron treated as described above, consisting of $\alpha$-FeOOH in the preferred case, can be treated at elevated temperatures without any sintering occurring during their conversion into neelde-shaped ferrimagnetic iron oxides. Excessive growth of the needle-shaped pigment particles during the conversion is also effectively prevented. Tempering of the surface-treated hydrated oxides of iron at temperatures in the range of about 600° to 900° C. is preferably carried out before the reduction and reoxidation.

The surface layers produced according to the precess of the present invention by the after-treatments are not destroyed to any significant extent by the temperature treatment and conversion of the hydrated oxides of iron.

The present invention therefore also provides needle-shaped ferrimagnetic iron oxides optionally doped with foreign metal ions for the magnetic recording of signals, having a surface consisting of at least two layers and alternately containing oxygen-containing anions and polyvalent cations. After their incorporation in a magnetic recording layer, the iron oxides of the present invention have a magnetic orientatability $B_r/4\pi I_s$ of at least 0.85. The iron oxides of the present invention are also found to be improved in their dispersibility in the binder.

In the preferred treatment, which consists of at least three stages, the iron oxides have a magnetic orientatability of at least about 0.87.

The present invention is illustrated by the following examples wherein α-FeOOH is used in which the needles, examined by X-Ray-methods have a width of ca. 300 Å, a length/width ratio of ca. 10 and a specific surface (according to BET) of ca. 30 m²/g. The α-FeOOH was prepared by a process of precipitation in which nuclei were first formed with the addition of phosphate as in Example 1 of German Auslegeschrift No. 1,176,111, followed by pigment formation with the addition of sodium hydroxide solution and a supply of air according to U.S. Pat. No. 3,652,334, Example 1. After filtration, the washed filter cake consisting in each case of 2 kg of α-FeOOH was mixed with salt-free water to form a suspension containing approximately 80 g of solid per liter.

EXAMPLE 1

(Comparison Example)

The suspension is heated to 80° C. with stirring and is maintained at this temperature during all the operations. The pH of the suspension, measured with a glass electrode, is adjusted to ca. 4 with dilute sulphuric acid. 26.1 g of $Na_4P_2O_7$. $10H_2O$ (corresponding to 0.42% by weight of $P_2O_5$, based on α-FeOOH) are dissolved in 200 ml of cold water. The resulting solution is added dropwise to the α-FeOOH suspension over a period of 30 minutes with stirring. The pH, which changes towards the alkaline region, is maintained at 4 by dropwise addition of sulphuric acid. The reaction mixture is then stirred for half an hour to complete the reaction. The suspension is suction filtered, washed with 2 liters of water and then dried. Conversion to magnetic iron oxide is carried out by the usual method. After dehydration to α-$Fe_2O_3$ at 300° to 400° C., the material is tempered at 750° C. for 30 minutes to adjust the crystals to the desired size. Reduction to $Fe_3O_4$ is carried out by treatment with moist hydrogen at 450° C. for 50 minutes and reoxidation is carried out by treatment with air at 300° C. for one hour.

EXAMPLE 2

The suspension is treated with $Na_4P_2O_7$ solution as in Example 1 and 31.4 g of $FeSO_4$. $7H_2O$ dissolved in 200 ml of $H_2O$ are then added to the suspension within half an hour. The pH is then raised to 8 within 10 minutes by dropwise addition of NaOH solution. The reaction mixture is then stirred for 30 minutes. The subsequent procedure is the same as in Example 1.

EXAMPLE 3

The procedure is the same as in Example 2 except that a solution of 25.0 g of $Al(SO_4)_3$. $18H_2O$ in 200 ml of water is used instead of the iron salt solutions.

EXAMPLE 4

The procedure is the same as in Example 2 except that a solution of 14.7 g of $Cr_2(SO_4)_3$ in 200 ml of water is used instead of the iron salt solution.

EXAMPLE 5

The procesure is the same as in Example 4 except that only 7.4 g of $Cr_2(SO_4)_3$ in 200 ml of water is used.

EXAMPLE 6

The procedure is the same as in Example 2 except that a solution of 9.6 g of $MnSO_4$. $H_2O$ in 200 ml of water is used instead of the iron salt solution.

EXAMPLE 7

776 g of FeOOH in 10 l of water is treated with 7.3 g of $Na_4P_2O_7$. $10H_2O$ and 5.1 g of $KCr(SO_4)_2$. $12H_2O$ as in Example 5, and a third layer is then applied, using 7.3 g of $Na_4P_2O_7$. $10H_2O$ in 300 ml of $H_2O$ at pH 5.

The tape is manufactured in each case from a standard formulation based on PVC-PVA according to British Pat. No. 1,080,614: 22.4 Parts by weight of the magnetic oxide and 8.0 parts by weight of a PVC-PVA copolymer are milled in a base mill for 3½ hours with the addition of 1.3 parts of oleic acid, 0.88 parts of organic phosphoric acid esters and 67 parts of butyl acetate-/ethyl acetate (1:1). The lacquer obtained is then cast onto a polyester foil 23 μm in thickness, orientated magnetically and calendered. The magnetic layer has a thickness of 12 μm and contains 15 g/m² of magnetic pigment.

The coercivity and orientatability of the magnetic tapes obtained are measured in a magnetic field of ca. 800 A/cm. The noise weighted background noise ($U_{f3}$) according to DIN 45405 was determined according to DIN 45 513, Sheet 4, using for comparison a DIN reference tape C 264 Z ($U_{F3}=\pm 0$ dB).

The results obtained are contained in the following Table.

The treatment according to the present invention, is, of course, not limited to the commercial α-FeOOH described here but is applicable to all the starting materials well known in the art for the production of needle-shaped magnetic iron oxides, e.g. β-FeOOH and γ-FeOOH. Furthermore, the starting materials may be doped, e.g. with Zn, Ca, Co, Ni, or Mn.

TABLE

| Example No. | $I^H C$ A/cm | $B_r/4\pi I_s$ | $U_{F3}$ dB |
|---|---|---|---|
| 1 (Comparison Example) | 285 | 0.83 | −0.5 |
| 2 | 308 | 0.86 | −0.5 |
| 3 | 292 | 0.86 | −0.5 |
| 4 | 292 | 0.85 | −0.5 |
| 5 | 259 | 0.85 | ±0 |
| 6 | 266 | 0.865 | ±0 |
| 7 | 296 | 0.88 | −0.5 |

It will be appreciated that the instant specification and examples are set forth by way of illustration and not limitation, and that various modifications and changes may be made without departing from the spirit and scope of the present invention.

What we claim is:

1. Needle-shaped ferrimagnetic iron oxide particles for magnetic signal recording, surface coated with at least two layers of which one contains oxygen-containing anions and the other polyvalent cations, the anions being selected from the group consisting of silicate, phosphate, borate, vanadate, molybdate and tungstate and the cations being selected from the group consisting of aluminum, chromium, manganese, iron and gallium.

2. Iron oxide particles according to claim 1, the individual layers of which have a monomolecular or monoatomic thickness.

3. Iron oxide particles according to claim 2, surface coated with two layers of oxygen-containing anions separated by a layer of polyvalent cations, each layer weighing about 0.1 to 1% of the weight of the particles.